US011959688B2

(12) United States Patent
Pareto et al.

(10) Patent No.: US 11,959,688 B2
(45) Date of Patent: Apr. 16, 2024

(54) WATER GATHERING AND DISTRIBUTION SYSTEM AND RELATED TECHNIQUES FOR OPERATING IN FREEZING ENVIRONMENTAL CONDITIONS

(71) Applicant: THE RENEWABLE SNOWMAKING COMPANY, Portland, ME (US)

(72) Inventors: Vittorio Pareto, Georgetown, MA (US); Peter Stein, Scarborough, ME (US)

(73) Assignee: THE RENEWABLE SNOWMAKING COMPANY, Portland, ME (US)

( * ) Notice: Subject to any disclaimer, the term of this patent is extended or adjusted under 35 U.S.C. 154(b) by 462 days.

(21) Appl. No.: 17/367,870

(22) Filed: Jul. 6, 2021

(65) Prior Publication Data

US 2021/0333033 A1  Oct. 28, 2021

Related U.S. Application Data

(63) Continuation-in-part of application No. 16/635,342, filed as application No. PCT/US2018/065480 on Dec. 13, 2018, now Pat. No. 11,118,824.

(51) Int. Cl.
*F25C 3/04* (2006.01)
*G05D 7/06* (2006.01)

(52) U.S. Cl.
CPC ............. *F25C 3/04* (2013.01); *G05D 7/0688* (2013.01); *F25C 2303/048* (2013.01)

(58) Field of Classification Search
CPC ................................ F25C 3/04; G05D 7/0688

(Continued)

(56) References Cited

U.S. PATENT DOCUMENTS 4,545,529 A    10/1985  Tropeano et al.
5,277,585 A *   1/1994  Aminighazvini ...... G09B 25/06
                                                          434/152

(Continued)

FOREIGN PATENT DOCUMENTS

KR    20140095847 A    8/2014
KR    20170142299 A    12/2017

OTHER PUBLICATIONS

Auma, Solutions for a world in motion, "Electric Actuators for Industrial Valve Automation", brochure, 2016, 88 pages.

(Continued)

*Primary Examiner* — Mohammad Ali
*Assistant Examiner* — Joshua T Sanders
(74) *Attorney, Agent, or Firm* — Hayes Soloway PC

(57) ABSTRACT

A water gathering and distribution system and related techniques for operating in freezing environmental conditions are disclosed. The system may include a water diverter unit or a water flow regulation unit configured to receive water from a water source situated at a location that is remote, inaccessible (or difficult to access), and/or experiences freezing environmental conditions and to deliver a controlled volume of that water for downstream use. The system further may include a water supply unit configured to receive that water and to supply it to downstream snowmaking equipment. In some instances, the supply unit also may cool the water to a temperature suitable, for example, for snowmaking. In a general sense, the disclosed system may be considered modular, in that multiple system components may be placed in flow communication with one another, as desired, to provide a distributed network of water collection and distribution elements.

14 Claims, 6 Drawing Sheets

(58) Field of Classification Search
USPC .......................................................... 700/282
See application file for complete search history.

(56) References Cited

U.S. PATENT DOCUMENTS

| | | | |
|---|---|---|---|
| 5,749,517 A | 5/1998 | Dupre | |
| 6,466,870 B2 | 10/2002 | Satonaka | |
| 2002/0116122 A1* | 8/2002 | Satonaka | F25C 3/04 342/357.57 |
| 2009/0110485 A1* | 4/2009 | Cripps | E02B 9/00 405/75 |
| 2009/0255865 A1* | 10/2009 | Lee | E02F 3/8858 210/170.09 |
| 2013/0048083 A1* | 2/2013 | Sato | E03B 1/044 137/862 |
| 2020/0277929 A1* | 9/2020 | Abe | F03B 15/04 |

OTHER PUBLICATIONS

QRFS, "3" Wafer Butterfly Valve with Tamper Switch, Guide, 2018, 5 pages.

* cited by examiner

WATER GATHERING AND DISTRIBUTION SYSTEM AND RELATED TECHNIQUES FOR OPERATING IN FREEZING ENVIRONMENTAL CONDITIONS

CROSS-REFERENCE TO RELATED APPLICATIONS

This patent application is a Continuation-in-Part of U.S. patent application Ser. No. 16/635,342, filed on Jan. 30, 2020, which is a national stage entry under 35 U.S.C. § 371 of PCT International Patent Application No. PCT/US2018/065480, filed on Dec. 13, 2018. Each of these patent applications is herein incorporated by reference in its entirety.

FIELD OF THE DISCLOSURE

The present disclosure relates to water distribution and more particularly to water distribution in freezing environmental conditions.

BACKGROUND

In the hydrologic cycle, rainwater infiltrates porous layers of mountains and recharges the groundwater, which in turn supplies water to mountain springs, streams, and aquifers. Depending on a mountain's soil characteristics, precipitation either infiltrates into the ground or flows along the surface gathering into streams. Some of the precipitation that is absorbed into the ground is retained in the root zone, where it is used by plants. The rest will continue to seep downward, within the mountain, until it reaches a depth below which all the spaces between the particles of sediment are filled, or saturated, with water. This is known as groundwater. The water table is the top of the saturated zone. When the saturated zone can yield a significant volume of groundwater, it is called an aquifer. A spring is formed when the groundwater reaches an impermeable layer (e.g., such as clay) within the mountain and eventually breaks though the surface. Mountain springs supply water to ponds or streams, which eventually discharge into rivers or lakes. Water that does not break though the surface in this way replenishes aquifers. Natural snow is formed when water vapor condenses and freezes in the form of small crystalline ice structures. Artificial snowmaking equipment simulates these conditions by spraying fine particles of water into the air. If the temperature is sufficiently low, the water droplets freeze into crystals and fall to the ground as snow.

SUMMARY

The subject matter of this application may involve, in some cases, interrelated products, alternative solutions to a particular problem, and/or a plurality of different uses of a single system or article.

One example embodiment provides a water diverter unit. The water diverter unit includes a first inlet pipe configured to be in flow communication with a water source to receive water therefrom. The water diverter unit further includes a first outlet pipe configured to be in flow communication with the first inlet pipe and a first downstream discharge point. The water diverter unit further includes a second outlet pipe configured to be in flow communication with the first inlet pipe and a downstream endpoint apparatus configured to utilize the water. The water diverter unit further includes a first diverter valve configured to direct the water between the first outlet pipe and the second outlet pipe, wherein the first diverter valve is motor-actuated and wirelessly controlled. The water diverter unit further includes an electronics assembly sealed within a first insulated housing disposed within the water diverter unit. The electronics assembly includes a controller configured to control the first diverter valve in directing the water between the first outlet pipe and the second outlet pipe. The electronics assembly further includes a power storage element configured to provide electric power to actuate the first diverter valve in directing the water between the first outlet pipe and the second outlet pipe. The electronics assembly further includes a communication module configured to receive a wireless signal and communicate with the controller in controlling the first diverter valve in directing the water between the first outlet pipe and the second outlet pipe. The water diverter unit further includes a local power generation element operatively coupled with the power storage element and configured to generate electricity to be stored by the power storage element.

In some cases, the water diverter unit further includes at least one of: a temperature sensor disposed within a flow pathway of the first inlet pipe; a pressure sensor disposed within a flow pathway of the first inlet pipe; and at least one flow sensor disposed within at least one of: a flow pathway of the first inlet pipe; and a flow pathway of the second outlet pipe.

In some cases: the power storage element is a battery; and the power generation element includes a turbine generator disposed within a flow pathway of one of the first inlet pipe or the first outlet pipe and configured to generate electricity.

In some cases, the water diverter unit further includes an adjustable shutoff valve disposed within a flow pathway of the first inlet pipe.

In some cases, the water diverter unit further includes a vent pipe configured to vent at least one of the first outlet pipe and the second outlet pipe to atmosphere. In some such cases, the water diverter unit further includes an adjustable shutoff valve disposed within a flow pathway of the vent pipe.

In some cases, the water diverter unit further includes a second insulated housing configured to house: at least a portion of each of the first inlet pipe, the first outlet pipe, and the second outlet pipe; the first diverter valve; and the electronics assembly.

In some cases, the water source is situated at a mountain and includes at least one of a spring, a stream, an aquifer, and a horizontal well.

In some cases, the water source is at a location that experiences freezing environmental conditions.

In some cases, the downstream endpoint apparatus includes a piece of snowmaking equipment.

Another example embodiment provides a water distribution system including: the water diverter unit described herein; and a water supply unit. The water supply unit includes a second inlet pipe configured to be in flow communication with the second outlet pipe of the water diverter unit to receive water therefrom. The water supply unit further includes a third outlet pipe configured to be in flow communication with the second inlet pipe and the downstream endpoint apparatus. The water supply unit further includes a fourth outlet pipe configured to be in flow communication with the second inlet pipe and either the first downstream discharge point or a second downstream discharge point. The water supply unit further includes a second diverter valve configured to direct the water between the third outlet pipe and the fourth outlet pipe. The water supply unit further includes a computer-controlled variable pressure and flow pump configured to automatically regulate at least one of a pressure and a flow of the water through the third outlet pipe according to a scheme based on prevailing weather conditions.

In some cases, the water supply unit further includes a cooling element configured to reduce a temperature of the water upstream of the downstream endpoint apparatus. In some such cases, the cooling element includes a series of radiator coils.

In some cases, the water supply unit further includes a third housing configured to house: at least a portion of each of the second inlet pipe, the third outlet pipe, and the fourth outlet pipe; the second diverter valve; and the cooling element. In some such cases, the third housing includes at least one ventilation panel configured to be opened and closed to adjust a degree of cooling provided to the water within the water supply unit.

Another example embodiment provides a water flow regulation unit. The water flow regulation unit includes a main body portion configured to be: disposed within a well casement pipe of a horizontal well to receive water collected by the horizontal well from a water source; and in flow communication with a downstream endpoint apparatus configured to utilize the water. The water flow regulation unit further includes a shutoff valve disposed within a flow pathway of the main body portion and configured to stop up a flow of the water within the main body portion, wherein the shutoff valve is motor-actuated and wirelessly controlled. The water flow regulation unit further includes an electronics assembly sealed within a first insulated housing disposed within the main body portion. The electronics assembly includes a controller configured to control the shutoff valve in stopping up the flow of water within the main body portion. The electronics assembly further includes a power storage element configured to provide electric power to actuate the shutoff valve in stopping up the flow of water within the main body portion. The electronics assembly further includes a communication module configured to receive a wireless signal and communicate with the controller in controlling the shutoff valve in stopping up the flow of water within the main body portion. The water flow regulation unit further includes a local power generation element operatively coupled with the power storage element and configured to generate electricity to be stored by the power storage element.

In some cases, the main body portion has at least one groove defined along an exterior thereof and configured to receive at least one sealing feature. In some such cases, the at least one sealing feature is an O-ring.

In some cases, the water flow regulation unit further includes at least one of a temperature sensor, a pressure sensor, and a flow sensor disposed within a flow pathway of the main body portion.

In some cases: the power storage element is a battery; and the power generation element includes a turbine generator disposed within a flow pathway of the main body portion and configured to generate electricity.

In some cases, the water flow regulation unit further includes a vent pipe configured to vent the main body portion to atmosphere. In some such cases, the water flow regulation unit further includes an adjustable shutoff valve disposed within a flow pathway of the vent pipe.

In some cases, the downstream endpoint apparatus includes a piece of snowmaking equipment.

Another example embodiment provides a water distribution system including: the water flow regulation unit described herein; and a water supply unit. The water supply unit includes an inlet pipe configured to be in flow communication with the main body portion of the water flow regulation unit to receive water therefrom. The water supply unit further includes a first outlet pipe configured to be in flow communication with the inlet pipe and the downstream endpoint apparatus. The water supply unit further includes a second outlet pipe configured to be in flow communication with the inlet pipe and a downstream discharge point. The water supply unit further includes a diverter valve configured to direct the water between the first outlet pipe and the second outlet pipe. The water supply unit further includes a computer-controlled variable pressure and flow pump configured to automatically regulate at least one of a pressure and a flow of the water through the third outlet pipe according to a scheme based on prevailing weather conditions.

In some cases, the water supply unit further includes a cooling element configured to reduce a temperature of the water upstream of the downstream discharge point, the cooling element including a series of radiator coils. Additionally, the water supply unit further includes a second housing including at least one ventilation panel configured to be opened and closed to adjust a degree of cooling provided to the water within the water supply unit, wherein the second housing is configured to house: at least a portion of each of the inlet pipe, the first outlet pipe, and the second outlet pipe; the diverter valve; and the cooling element.

Another example embodiment provides a method of distributing water in freezing environmental conditions without utilizing AC power. The method includes receiving water from a water source located in the freezing environmental conditions. The method further includes delivering a controlled volume of the water to either: a downstream endpoint apparatus configured to utilize the controlled volume of water when there is a demand for the water by the downstream endpoint apparatus; or a downstream discharge point when there is no demand for the water by the downstream endpoint apparatus; wherein delivering the controlled volume of water to either the downstream endpoint apparatus or the downstream discharge point involves diverting the water via a wirelessly controlled diverter valve configured to be powered by a power storage element operatively coupled with a power generation element disposed within a flow path leading to the downstream discharge point.

In some cases, the power storage element is a battery; and the power generation element includes a turbine generator.

In some cases, prior to delivering the controlled volume of water to the downstream endpoint apparatus, the method further includes: reducing a temperature of the water. In some such cases, the downstream endpoint apparatus includes a piece of snowmaking equipment.

In some cases, the water source is situated at a mountain and includes at least one of a spring, a stream, an aquifer, and a horizontal well.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

Figure 1:
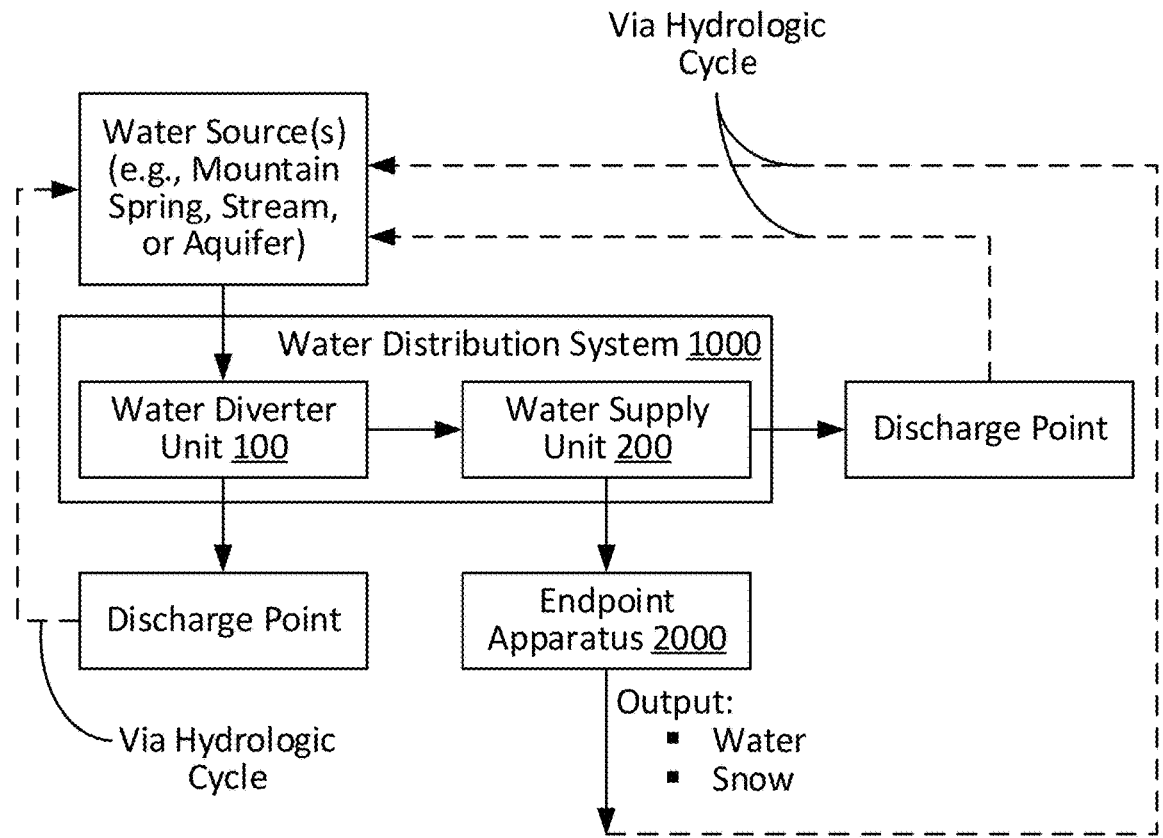
FIG. 1 is a block diagram illustrating an example implementation of a water distribution system configured in accordance with an embodiment of the present disclosure.

These and other features of the present embodiments will be understood better by reading the following detailed description, taken together with the figures herein described. In the drawings, each identical or nearly identical component that is illustrated in various figures may be represented by a like numeral. For purposes of clarity, not every component may be labeled in every drawing. Furthermore, as will be appreciated in light of this disclosure, the accompanying drawings are not intended to be drawn to scale or to limit the described embodiments to the specific configurations shown.

DETAILED DESCRIPTION

A water gathering and distribution system and related techniques for operating in freezing environmental conditions are disclosed. In accordance with some embodiments, the disclosed system may include a water diverter unit or a water flow regulation unit configured to receive water from a spring, stream, aquifer, horizontal well, or other water source situated at a location that experiences freezing environmental conditions and to deliver a controlled volume of that water for downstream use. In accordance with some embodiments, the disclosed system further may include a water supply unit configured to receive the water from the water diverter unit or flow regulation unit and to supply it to downstream snowmaking equipment. In some instances, the supply unit also may cool the water to a temperature suitable, for example, for snowmaking. In a general sense, the disclosed system may be considered modular, in that multiple system components may be placed in flow communication with one another, as desired, to provide a distributed network of water collection and distribution elements. Numerous configurations and variations will be apparent in light of this disclosure.

General Overview

The economics of alpine ski-areas are heavily dependent on random fluctuations in winter weather conditions. Because most of the operating costs are fixed, the amount of snow, especially ahead of major holiday periods, has an enormous impact on profitability. In recent years, this problem has been exacerbated by the effects of climate change, which have introduced the potential for a trend line of shorter seasons, declining snow fall, and more frequent rain events. Ski-areas have attempted to address these growing problems by making progressively larger investments in snowmaking equipment. Recent studies suggest that climate change is driving rapid expansion of the snowmaking market.

Snowmaking can bring a measure of control over the fluctuations of the weather, which, in turn, can help improve revenue predictability. However, this strategy has significant costs. The process of making artificial snow is energy intensive and expensive. The cost of electricity for snowmaking alone can account for between one-half to three-quarters of the total electricity budget for resorts with extensive snowmaking capabilities. Moreover, in most cases, this electricity is made with fossil fuels, which contributes to climate change. Thus, overall, the process of making snow, in fact, is furthering the very problem snowmaking is intended to address.

Many ski areas have made considerable investments to improve the efficiency of snowmaking equipment. This has helped lower costs and reduce their carbon footprint, but despite these improvements, for most resorts, snowmaking remains the largest source of electric power consumption.

Existing snowmaking equipment comes in a variety of forms, including elevated towers, fan-based cannons, and ground-level snow guns. These means of artificial snowmaking simulate natural snowmaking conditions by spraying fine particle of water into the air. Some of these means are designed to maximize the time that the fine particles of water travel in the air. Injecting compressed air, for example, gives the particles a higher initial velocity, using tall towers increases the vertical distance they must travel before reaching the ground, and a powerful fan may help increase the time the particles are suspended in the air.

Over the last several years, manufacturers have invested in a variety of mechanisms to improve equipment efficiency, for instance, to find ways to lower inlet water pressure requirements and to reduce the need for air compressors. This has led to improvements in nozzle design, to the use of additives in the water, to the employment of large fans, and to the introduction of tower-based designs. At least one manufacturer, Ratnik Industries, Inc., has designed a tower-based snow gun that eliminates the need for compressed air and, hence, air compressors.

However, little progress has been made in finding a way to reduce the cost of pumping water to supply the snow guns. While configurations vary, water is generally pumped significant vertical distances from rivers and lakes and then uphill. Even before improvements in efficiency, which have lowered compressed air requirements, pumping the water already represented the largest source of energy usage for many ski areas. With the increasing use of high-efficiency snowmaking equipment, the percentage of the energy used to pump water has only increased.

The energy required to pump water is proportional to the increase in elevation, the pipe resistance, and the inlet pressure required by the snow gun. Designers of snowmaking systems size pumps to operate at maximum levels of efficiency, but in the end, the pumps still must send the water thousands of feet uphill through a network of narrow pipes, which is an energy-intensive process. One way to eliminate pumping costs is to use a water source located above the snow gun.

Aquifers, streams, and springs often form at high elevations, and the technologies for extracting water from them is well-established. Wells may be used to extract water from aquifers, and water collection systems can be installed to divert water from springs or streams. However, these resources are important to the local ecology and are frequently critical to the regional economy. Because water can travel great distances, upstream extraction can have a profound impact on aquifers, lakes, and reservoirs located many miles away. For this reason, water use is strictly regulated and controlled by a variety of governmental agencies. Although rules vary from place to place, regulatory agencies generally impose a limit on the percentage of water that can be extracted by upstream landowners, along with monitoring and reporting requirements. The maximum amount of water that can be drawn from any of collection system is regulated. In general, the systems are permissible, provided the percentage of water extracted is monitored and remains below the applicable regulatory limits.

Generally, snowmaking requires large volumes of water for relatively short periods of time. In principle, one can envision a mountain-water extraction mechanism operating within the noted regulatory constraints by diverting a limited percentage of the available water. Such a system would have substantial economic and environmental benefits by displacing the need to pump water uphill. However, diverting the water for limited periods during typical alpine ski area winter conditions creates a variety of practical and technical challenges. For instance, one non-trivial challenge is that a diverter valve located near the collection system may not be readily accessible in winter conditions. High-elevation water sources are often located in remote parts of the mountain, and the surrounding snow can make them inaccessible or simply difficult to access in a reasonably timely manner. Another non-trivial challenge is that a single high-elevation water source usually will not have the capacity to supply water in sufficient quantities. At the same time, a distributed water collection system involving the aggregation of many water sources is cumbersome and time-consuming to manage, as compared to when the entire supply is taken from a single source. Another non-trivial challenge is that to prevent freezing, the water piping must drain completely when not in use. During much of the season, the diverter unit itself often will be buried under several feet of snow and ice. This means that any venting designed to allow the water to drain by gravity must be able to function when the diverter assembly is covered in snow and ice. Another non-trivial challenge is that any mechanical or electrical components which might fail under extreme cold conditions must be isolated from the cold. Another non-trivial challenge is that high-elevation water sources are usually at locations without access to AC power and bringing power cables to these remote locations may be cost-prohibitive. Another non-trivial challenge is that vertical wells typically require AC power for pumping equipment. Another non-trivial challenge is that if the flow of horizontal wells is to be controlled, a shutoff valve may be required. Because these wells may be in remote parts of the mountain, the surrounding snow can make their flow control valves inaccessible or simply difficult to access in a reasonably timely manner. Another challenge is that groundwater, which generally emerges at a temperature of about 50° F. or higher, may need to be cooled to meet inlet temperature specifications for snowmaking equipment.

These and other obstacles have prevented ski areas from sourcing their snowmaking-water needs from high-elevation water sources, such as mountain springs, streams, aquifers, and horizontal wells.

Thus, and in accordance with some embodiments of the present disclosure, a water gathering and distribution system and related techniques for operating in freezing environmental conditions are disclosed. In accordance with some embodiments, the disclosed system may include a water diverter unit or a water flow regulation unit configured to receive water from a spring, stream, aquifer, horizontal well, or other water source situated at a location that is remote, inaccessible (or difficult to access), and/or experiences freezing environmental conditions and to deliver a controlled volume of that water for downstream use. In accordance with some embodiments, the disclosed system further may include a water supply unit configured to receive the water from the water diverter unit or flow regulation unit and to supply it to downstream snowmaking. In some instances, the supply unit also may cool the water to a temperature suitable, for example, for snowmaking. In a general sense, the disclosed system may be considered modular, in that multiple system components may be placed in flow communication with one another, as desired, to provide a distributed network of water collection and distribution elements.

In accordance with some embodiments, a water diverter unit provided as variously described herein may be configured to divert a controlled volume of water received from an upstream water source (a) for a limited duration, (b) in freezing environmental conditions, (c) with no access to AC power, while (d) located in an area that may not be readily accessed due to the freezing environmental conditions. In accordance with some embodiments, a flow regulation unit provided as variously described herein may be configured to (a) regulate the flow of water from a horizontal well, (b) in freezing environmental conditions, (c) with no access to AC power, while (d) located in an area that may not be readily accessed due to the freezing environmental conditions.

In accordance with some embodiments, the disclosed system may be configured such that, when water is not being diverted from a given water source, water within the system may be permitted to drain out (e.g., to below the installation site) via gravity, thereby preventing water from freezing therein and causing damage, even if the system is buried beneath several feet of snow and ice.

The disclosed system may be configured, in accordance with some embodiments, for routine and sustained operation in freezing environmental temperatures and harsh winter weather conditions, as typically may be experienced at skiing and other snow-sports locations. In some instances, the disclosed system may be operated in this manner for an extended period (e.g., for an entire ski season or longer).

In accordance with some embodiments, the disclosed system may be configured to distribute water to one or more downstream pieces of snowmaking equipment, such as snow guns/cannons. In accordance with some embodiments, the disclosed system may be configured to cool the water to a temperature suitable for snowmaking prior to delivering that water to downstream snowmaking equipment. In accordance with some embodiments, the disclosed system may be configured for use in locations that are remote or otherwise may not be accessible with traditional snowmaking equipment or because of freezing environmental conditions. In accordance with some embodiments, the disclosed system may be configured to operate remotely without need for an external AC power source. In accordance with some embodiments, the disclosed system may be provided as part of a larger network of such systems, allowing for aggregating/gathering of water from a distributed network of multiple water sources that otherwise, individually, might not yield sufficient water to supply snowmaking equipment. Numerous suitable uses and applications for the disclosed system and techniques will be apparent in light of this disclosure.

In accordance with some embodiments, the disclosed system may be utilized to channel excess water released from snowmelt (e.g., during the snowmelt season or when otherwise not making snow) to one or more hydroelectric power generators to produce electricity. Thus, in a general sense, the disclosed system may be configured to be used in harvesting the energy released by accumulated snow during the snowmelt season. In accordance with some embodiments, the disclosed system may be configured to generate sufficient electricity to sustain its own operation, avoiding need for an external AC power source at the installation site.

In accordance with some embodiments, the disclosed system may be configured to provide a water extraction and distribution process that measures the available water and only diverts a controlled amount of the available water for a limited duration (e.g., during snowmaking operations). In accordance with some embodiments, the disclosed system may be configured to generate electricity for its own sustained use. In accordance with some embodiments, the disclosed system may be configured to take advantage of the natural energy in high-elevation water, the need for pumping large volumes of water uphill from lower elevations may be eliminated (or otherwise reduced). Furthermore, at least in some instances, the need for booster pumps may be eliminated (or otherwise reduced). As will be appreciated in light of this disclosure, use of the disclosed system and techniques may realize any of a wide range of benefits and advantages over existing approaches.

In some cases, use of the disclosed system may result in a reduction in external electric power generation that otherwise would need to occur to provide for snowmaking. In turn, this may result in a reduction in fossil fuel consumption that otherwise would be required in generating the displaced electric power. In turn, this may result in a reduction in greenhouse gas and other emissions normally associated with producing electric power from fossil fuels via fossil fuel-based generators. In turn, this may result in a reduction in the greenhouse gas footprint associated with the overall snowmaking operation.

System Architecture and Operation

FIG. 1 is a block diagram illustrating an example implementation of a water distribution system 1000 configured in accordance with an embodiment of the present disclosure. As can be seen, system 1000 may include a water diverter unit 100 and a water supply unit 200, each discussed below in turn. As described herein, system 1000 may be configured to receive a volume of water from one or more upstream water sources and to distribute that water to one or more downstream destinations. For instance, system 1000 may be configured to distribute water to either (or both) a downstream discharge point (e.g., such as a stream or other surface water) and a downstream endpoint apparatus 2000. As will be appreciated in light of this disclosure, any one, or combination, of suitable water sources may be utilized, including, for example, a spring, a stream, an aquifer, or a horizontal well, to name a few, any of which may be a high-elevation water source located in an area, for example, that experiences freezing environmental conditions. As further described herein, system 1000 may be configured, in accordance with some embodiments, to supply water to endpoint apparatuses 2000, such as snowmaking equipment (e.g., snow guns/cannons, etc.) as typically may be found at skiing and other snow-sports areas.

Figure 2:
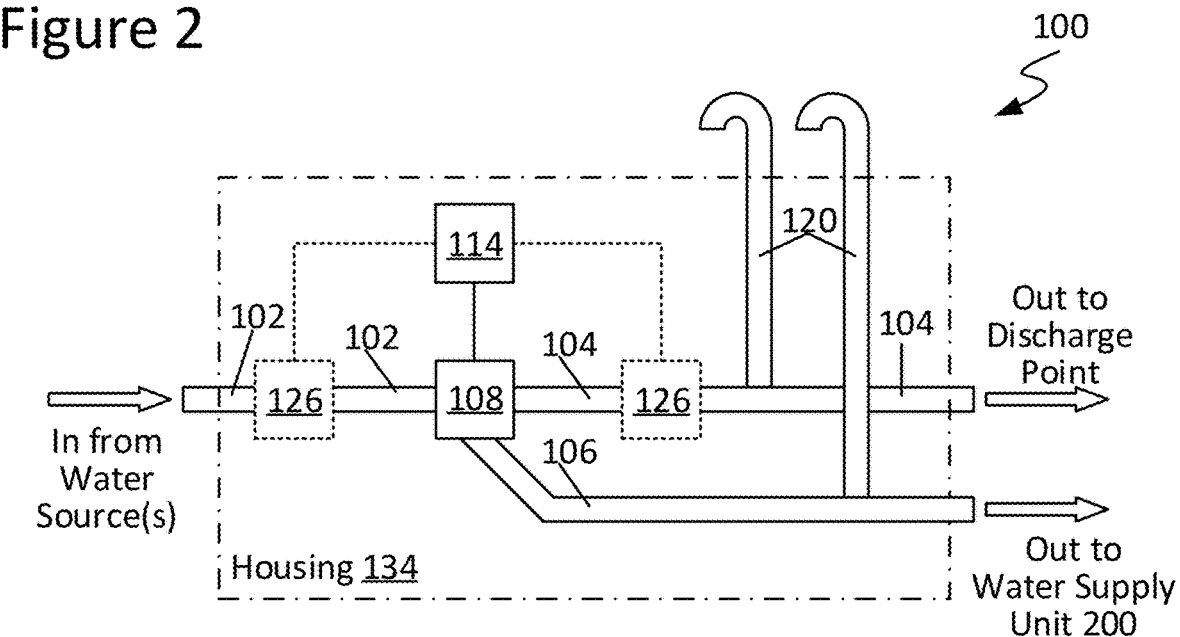
FIG. 2 illustrates a water diverter unit configured in accordance with an embodiment of the present disclosure.
Figure 3:
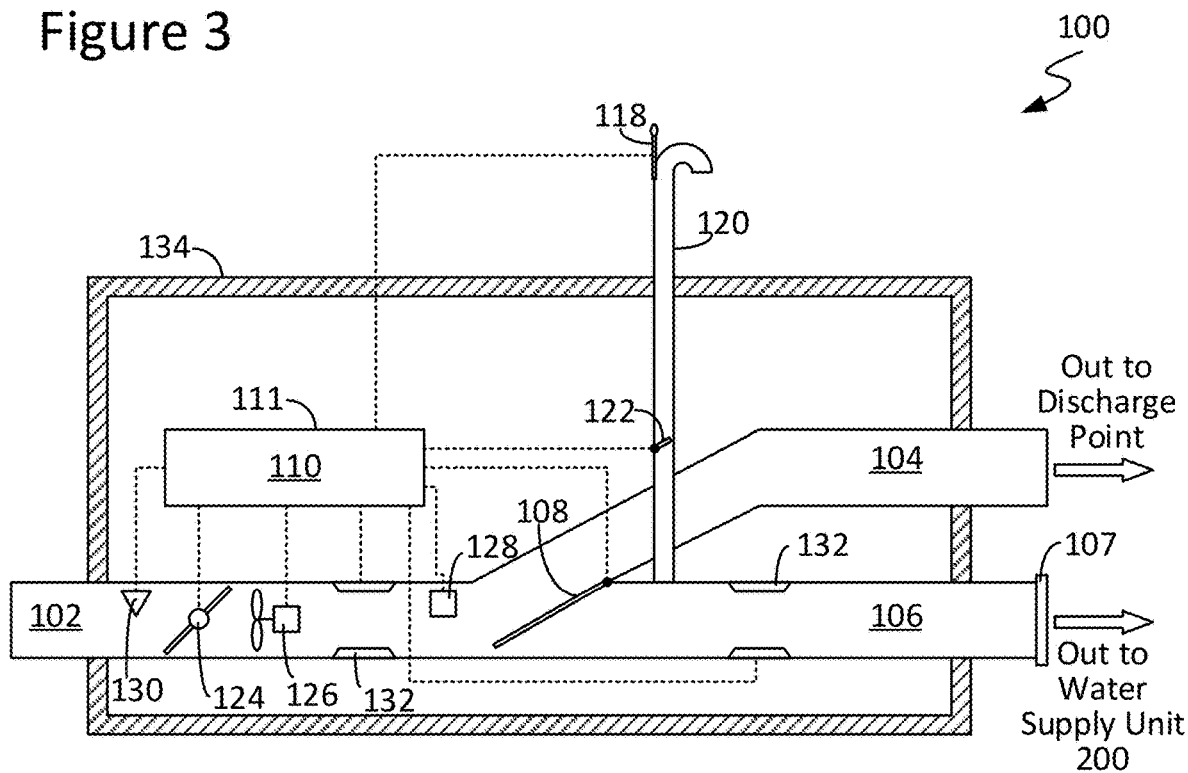
FIG. 3 illustrates a water diverter unit configured in accordance with another embodiment of the present disclosure.

FIG. 2 illustrates a water diverter unit 100 configured in accordance with an embodiment of the present disclosure. FIG. 3 illustrates a water diverter unit 100 configured in accordance with another embodiment of the present disclosure. As described herein, diverter unit 100 may be configured, in accordance with some embodiments, to receive water from one or more upstream water sources and to divert a controlled volume of that water to either (or both) a downstream discharge point and a downstream water supply unit 200 (and, thus, ultimately to a downstream endpoint apparatus 2000).

Figure 4:
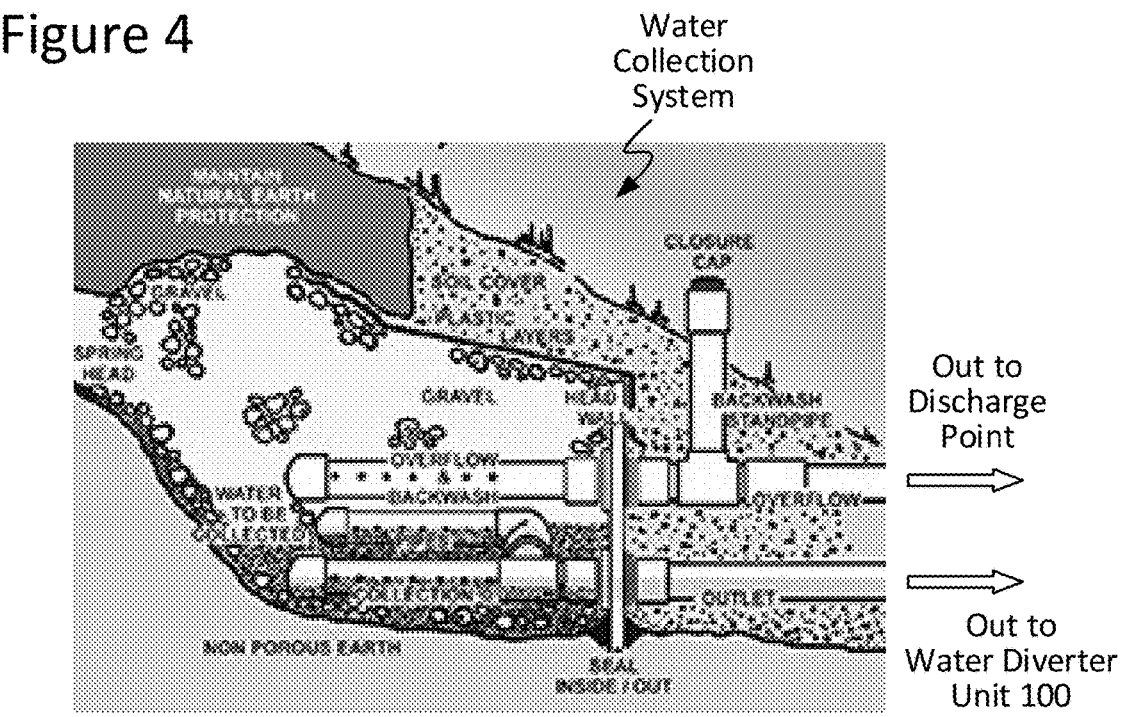
FIG. 4 illustrates an example water collection unit to which a water diverter unit configured as provided herein may be operatively coupled, in accordance with an embodiment of the present disclosure.

As can be seen in FIGS. 2-3, diverter unit 100 may include an inlet pipe 102. Inlet pipe 102 may be configured, in accordance with some embodiments, to be in flow communication with a given upstream water source and with outlet pipes 104, 106 (discussed below). In some embodiments, inlet pipe 102 may be configured to be operatively coupled, and thus in flow communication, with a given water collection and/or extraction unit configured to obtain water from an upstream water source. For instance, consider FIG. 4, which illustrates an example water collection unit to which diverter unit 100 may be operatively coupled, in accordance with an embodiment of the present disclosure. Water collection may be provided, in part or in whole, by an installed water collection system, and the water may enter diverter unit 100 via inlet pipe 102. Although the example water collection unit depicted in FIG. 4 is one commercially available from Carolina Water Tank that may be used in a spring or stream, as will be apparent in light of this disclosure, any of a wide range of other suitable water collection and/or extraction systems may be provisioned for operative coupling with a diverter unit 100 configured as described herein, in accordance with some embodiments.

Returning to FIGS. 2-3, diverter unit 100 also may include a first outlet pipe 104 and a second outlet pipe 106. First outlet pipe 104 may be configured, in accordance with some embodiments, for flow communication with upstream inlet pipe 102 and a downstream discharge point (e.g., such as a stream), thus providing a first flow pathway through diverter unit 100. In some embodiments, a downstream end of first outlet pipe 104 optionally may include an adaptor, flange, or other connector of any suitable configuration, as will be apparent in light of this disclosure. Second outlet pipe 106 may be configured, in accordance with some embodiments, for flow communication with upstream inlet pipe 102 and a downstream water supply unit 200 (discussed below), thus providing a second flow pathway through diverter unit 100. In accordance with some embodiments, the downstream end of second outlet pipe 106 may be configured to be operatively coupled, and thus in flow communication with, inlet pipe 202 of downstream supply unit 200 (see FIG. 6, discussed below). To that end, in some embodiments, the downstream end of second outlet pipe 106 optionally may include an adaptor, flange, or other connector 107 of any suitable configuration for engaging inlet pipe 202 of supply unit 200, as will be apparent in light of this disclosure.

The dimensions (e.g., length; diameter/width), geometry, and material construction of each of inlet pipe 102, first outlet pipe 104, and second outlet pipe 106 of diverter unit 100 may be customized, as desired for a given target application or end-use. In some embodiments, any of pipes 102, 104, 106 may be constructed, in part or in whole, from a polyvinylchloride (PVC) material or a stainless-steel material, among other options.

Diverter unit 100 further may include an adjustable diverter valve 108. Diverter valve 108 may be configured, in accordance with some embodiments, to divert the flow of water through diverter unit 100 from inlet pipe 102 through either of outlet pipes 104, 106. To that end, diverter valve 108 may be disposed along the flow pathway from inlet pipe 102 to outlet pipes 104, 106, for instance, at a junction of outlet pipes 104, 106. In some embodiments, diverter valve 108 may be an adjustable flow valve. In some embodiments, diverter valve 108 may be actuated by an associated motor. In some embodiments, diverter valve 108 may be configured to be remotely controlled (e.g., may be radio-controlled via a given RF signal source). To that end, diverter valve 108 may be operatively coupled with an antenna 118 (discussed below). As will be appreciated in light of this disclosure, providing for remote activation of diverter valve 108 may be beneficial, for instance, in cases where diverter unit 100 may not be readily accessible given environmental conditions (e.g., in typical weather conditions prevalent in alpine ski areas).

If diverter valve 108 is adjusted to block off second outlet pipe 106 completely, then the water flowing through inlet pipe 102 may be routed through only first outlet pipe 104. Thus, first outlet pipe 104 may serve, in a general sense, as a bypass or pass-through for water flowing through diverter unit 100 from the upstream water source(s) to the downstream discharge point (e.g., stream). If instead diverter valve 108 is adjusted to block off first outlet pipe 104 completely, then the water flowing through inlet pipe 102 may be routed through only second outlet pipe 106. Thus, diverter valve 108 may be utilized to provide and cut off the flow of water to downstream supply unit 200 whenever desired (e.g., when snowmaking via a downstream endpoint apparatus 2000 is not desired).

In accordance with some embodiments, when there is a downstream demand for water (e.g., such as during snowmaking operations via endpoint apparatus 2000), diverter valve 108 may be actuated, redirecting the water to second outlet pipe 106 and, in turn, to downstream supply unit 200. In accordance with some embodiments, when there is no longer a downstream demand for water, diverter valve 108 may be actuated, redirecting the water to first outlet pipe 104 and, in turn, to the downstream discharge point. In accordance with some embodiments, diverter valve 108 may be designed to fail in the position that seals off second outlet pipe 106, thereby ensuring the normal flow of the water through diverter unit 100 will not be negatively impacted by failure of diverter valve 108. This may allow the water to flow undisturbed through its natural course, returning to a stream (or other discharge point), in part or in whole.

Figure 5:
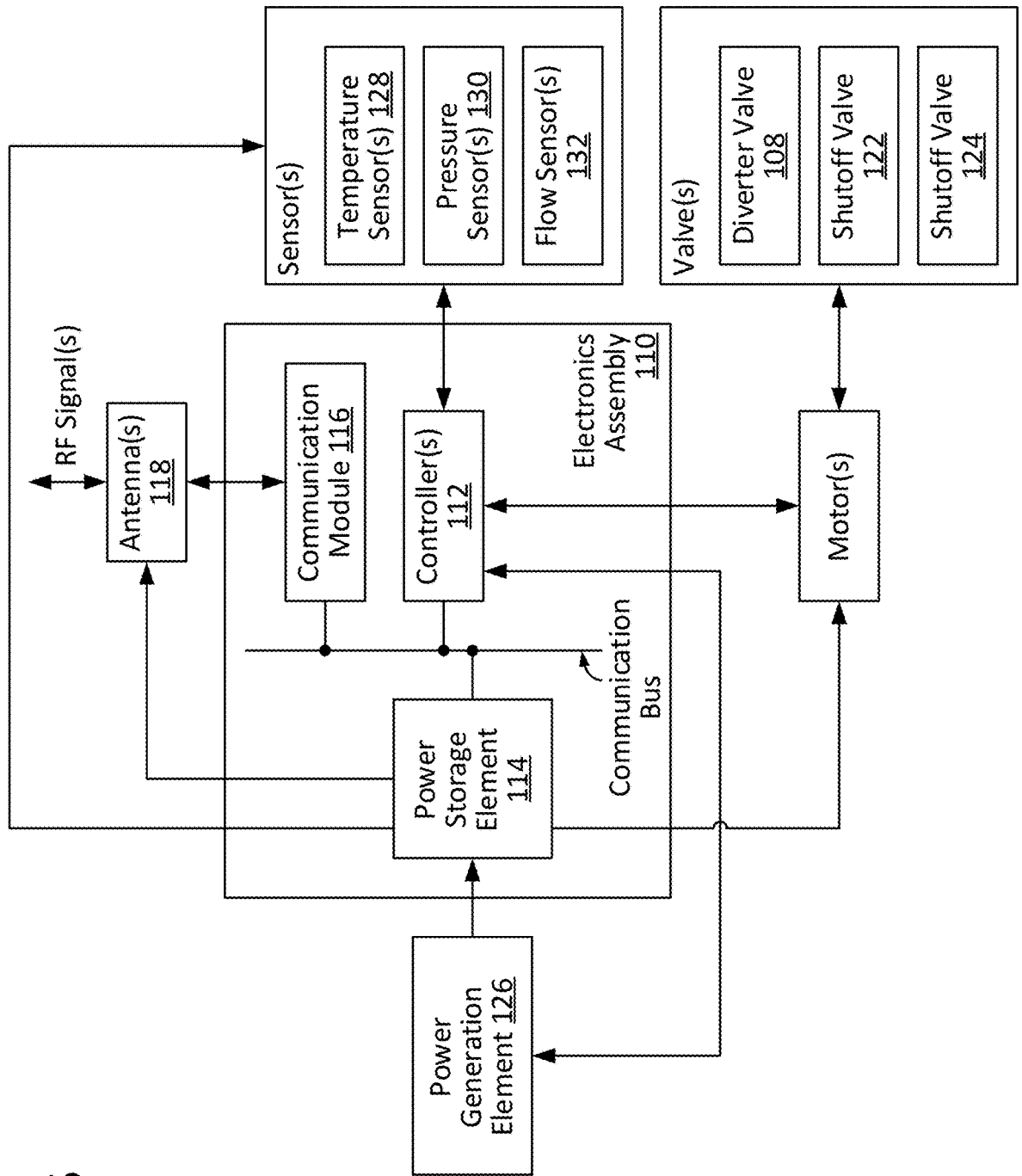
FIG. 5 is a block diagram illustrating communicative coupling of an electronics assembly of a water diverter unit with various constituent elements of the water diverter unit, in accordance with an embodiment of the present disclosure.

Diverter unit 100 also may include an electronics assembly 110 including various electronic elements, such as, for example, a controller 112, a power storage element 114, and a communication module 116, among others. FIG. 5 is a block diagram illustrating communicative coupling of electronics assembly 110 with various constituent elements of a water diverter unit 100, in accordance with an embodiment of the present disclosure. Each of these elements is discussed in turn below.

Controller 112 may be configured to electronically control operation of one or more components of diverter unit 100. For instance, controller 112 may be configured, in accordance with some embodiments, to be operatively coupled with any (or all) of diverter valve 108, shutoff valve 122, shutoff valve 124, a given power generation element 126 (discussed below), and a given sensor (e.g., such as a temperature sensor 128, a pressure sensor 130, and a flow sensor 132, each discussed below) to effectuate electronic control of the operation thereof. To such ends, controller 112 may host one or more control modules and may be programmed or otherwise configured to output one or more control signals that may be utilized in controlling the operation of a given element of diverter unit 100 operatively coupled therewith. In an example embodiment, controller 112 may be a microcontroller, which may be RF networked.

In accordance with some embodiments, module(s) of controller 112 may be implemented in any suitable standard, custom, or proprietary programming language, such as, for example, C, C++, objective C, JavaScript, or any other suitable instruction set, as will be apparent in light of this disclosure. The module(s) of controller 112 can be encoded, for example, on a machine-readable medium that, when executed by a processor, carries out the target functionality, in part or in whole. The computer-readable medium may be, for example, a hard drive, a compact disk, a memory stick, a server, or any suitable non-transitory computer or computing device memory that includes executable instructions, or a plurality or combination of such memories. Some embodiments can be implemented, for instance, with gate-level logic, an application-specific integrated circuit (ASIC) or chip set, or other such purpose-built logic. Some embodiments can be implemented with a microcontroller having input/output capability (e.g., inputs for receiving user inputs; outputs for directing other components) and embedded routines for carrying out device functionality. In a more general sense, the functional modules of controller 112 can be implemented in any one, or combination, of hardware, software, and firmware, as desired for a given target application or end-use. Moreover, in some embodiments, a given module of controller 112 (or controller 112 more generally) may be programmable to achieve any of the various functions and capabilities desired of diverter unit 100 for a given target application or end-use.

Power storage element 114 may be configured to supply a given target amount of electric power to any of the various components of diverter unit 100. To that end, power storage element 114 may be any suitable standard, custom, or proprietary power storage device, as will be apparent in light of this disclosure. In some embodiments, power storage element 114 may be a battery, which may be permanent or replaceable. In accordance with some embodiments, power storage element 114 may be configured to be operatively coupled with any (or all) of diverter valve 108, shutoff valve 122, and shutoff valve 124 (e.g., with a motor associated with any such valve 108, 122, 124, if optionally present) to provide electric power thereto, for instance, to cause such valve 108, 122, 124 to open or close, as desired.

In accordance with some embodiments, power storage element 114 may be configured to be operatively coupled with a given power generation element 126 (discussed below) such that electricity generated by power generation element(s) 126 may be used in charging power storage element 114 or in other use by diverter unit 100 (or system 1000 more generally). In some embodiments, power storage element 114 optionally may include (or otherwise be operatively coupled with) a photovoltaic module (e.g., a solar cell) configured to convert light energy to electrical energy for storage by power storage element 114 or other use by diverter unit 100 (or system 1000 more generally). In some embodiments, power storage element 114 optionally may be operatively coupled with a wind turbine configured to convert wind energy to electrical energy for storage by power storage element 114 or other use by diverter unit 100 (or system 1000 more generally).

Communication module 116 may be configured as a transmitter, a receiver, or both (i.e., a transceiver). In some cases, communication module 116 may be separate and distinct from controller 112 (e.g., as generally shown in FIG. 5), though in some other cases, communication module 116 may be a component of or otherwise integrated with controller 112. Communication module 116 may be configured, in accordance with some embodiments, for either (or both) wired and wireless communication utilizing any one, or combination, of suitable communication means, such as RF signal, Wi-Fi signal, Bluetooth signal, Universal Serial Bus (USB), Ethernet, or FireWire, among others. In some embodiments, communication module 116 may be (or otherwise include) a wireless router configured to receive and/or transmit RF signals. Communication module 116 may be configured, in accordance with some embodiments, to receive signal(s) from an external source, such as a control device/interface, for example, which may be utilized in remotely operating diverter unit 100, in part or in whole. To such ends, communication module 116 may be configured, in accordance with some embodiments, to be operatively coupled with an antenna 118 (discussed below) configured to transmit and/or receive one or more signals.

As noted above, diverter unit 100 also may include one or more antennas 118 configured to receive and/or transmit one or more RF signals or other signals. To such ends, a given antenna 118 may be any suitable standard, custom, or proprietary antenna device, as will be apparent in light of this disclosure, and may be directional or omnidirectional, as desired for a given target application or end-use. A given antenna 118 may be configured, in accordance with some embodiments, to be operatively coupled with communication module 116 to communicate with controller 112. In an example embodiment, an antenna 118 may be configured to be attached to or otherwise disposed alongside a vent pipe 120 (discussed below) of diverter unit 100.

Any (or all) of the constituent electronics of electronics assembly 110 optionally may be housed in a housing 111, which may be configured, in accordance with some embodiments, to protect the housed electronics by being substantially impermeable to water and debris and, optionally, thermally insulated, in part or in whole. Also, the dimensions, geometry, and material construction of housing 111 may be customized, as desired for a given target application or end-use. As will be appreciated in light of this disclosure, the flow of water at a temperature of about 50° F. or greater through diverter unit 100 may help to keep the electronic elements within temperature specifications for operation of diverter unit 100.

In accordance with some embodiments, either (or both) of first outlet pipe 104 and second outlet pipe 106 may include one or more vent pipes 120. A given vent pipe 120 may be configured, in accordance with some embodiments, to vent an associated outlet pipe 104, 106 to atmosphere, letting air in to displace the water so as to ensure that its associated outlet pipe 104, 106 drains when desired (e.g., when not in use). In some cases, a given vent pipe 120 may be configured to provide passive air venting. A given vent pipe 120 may be disposed along the flow pathway within diverter unit 100, for instance, downstream of diverter valve 108. In accordance with some embodiments, first outlet pipe 104 may be vented via an associated vent pipe 120 to allow any water therein to drain out (e.g., by gravity), helping to prevent the water from freezing therein and causing damage to first outlet pipe 104 and, if present, power generation element 126. In accordance with some embodiments, second outlet pipe 106 may be vented via an associated vent pipe 120 to allow any water therein to drain out (e.g., by gravity), helping to prevent the water from freezing therein and causing damage to second outlet pipe 106. The dimensions (e.g., length; diameter/width), geometry, and material construction of a given vent pipe 120 may be customized, as desired for a given target application or end-use. In some embodiments, a given vent pipe 120 may be constructed, in part or in whole, from a polyvinylchloride (PVC) material or a stainless-steel material, among other options. Also, as will be appreciated in light of this disclosure, it may be desirable to ensure that a given vent pipe 120 is of sufficient length to prevent (or otherwise reduce the likelihood) of its being completely covered and blocked, for instance, by snow and ice.

In accordance with some embodiments, a given vent pipe 120 may include an adjustable shutoff valve 122. Shutoff valve 122 may be configured, in accordance with some embodiments, to stop or otherwise regulate the flow of air (or other fluid) through its associated vent pipe 120. To that end, shutoff valve 122 may be disposed along the flow pathway within vent pipe 120, preferably proximate the junction of vent pipe 120 with its associated outlet pipe 104, 106. In some embodiments, shutoff valve 122 may be actuated by an associated motor. In some embodiments, shutoff valve 122 may be configured to be remotely controlled (e.g., may be radio-controlled via a given RF signal source). To that end, shutoff valve 122 may be operatively coupled with an antenna 118 and controller 112.

In accordance with some embodiments, diverter unit 100 may include an adjustable shutoff valve 124. Shutoff valve 124 may be configured, in accordance with some embodiments, to stop or otherwise regulate the flow of water through diverter unit 100. To that end, shutoff valve 124 may be disposed along the flow pathway within inlet pipe 102, preferably upstream of outlet pipes 104, 106 and diverter valve 108. In some embodiments, shutoff valve 124 may be actuated by an associated motor. In some embodiments, shutoff valve 124 may be configured to be remotely controlled (e.g., may be radio-controlled via a given RF signal source). To that end, shutoff valve 124 may be operatively coupled with an antenna 118 and controller 112.

In accordance with some embodiments, diverter unit 100 may include (or otherwise have access to) one or more power generation elements 126. A given power generation element 126 may be configured, in accordance with some embodiments, to generate electricity to be stored by power storage element 114. In accordance with some embodiments, a given power generation element 126 may be, for example, a turbine generator disposed along the flow path of diverter unit 100 and configured to generate electricity from the flow of water therethrough. To that end, a given power generation element 126 may be any suitable standard, custom, or proprietary turbine-based electricity generator, as will be apparent in light of this disclosure. In some cases, a given power generation element 126 may be, for instance, a DC microturbine generator configured to generate DC power. The electricity produced by a given power generation element 126 may be used to charge power storage element 114 (e.g., when downstream endpoint apparatus 2000 is not operating to make snow) and/or to power one or more components of diverter unit 100, in accordance with some embodiments. In accordance with some embodiments, a given power generation element 126 may be configured to provide enough power to recharge power storage element 114 and, therefore, allow diverter unit 100 to operate remotely for an extended period (e.g., for an entire season ski season or longer). In some embodiments, diverter unit 100 may include a power generation element 126 disposed within first outlet pipe 104, downstream of diverter valve 108. In this arrangement, the water flows though diverter valve 108 and into a power generation element 126 before being discharged (e.g., into a stream or other suitable discharge point) via first outlet pipe 104. In some embodiments, diverter unit 100 additionally, or alternatively, may include a power generation element 126 disposed within inlet pipe 102, upstream of diverter valve 108.

The present disclosure is not intended to be so limited only to turbine generators, however, as additional and/or different configurations for power generation element 126 will be apparent in light of this disclosure. For instance, in some cases, power generation element 126 may be a solar-based power generation element. In some cases, power generation element 126 may be a wind-based power generation element. Other suitable configurations and arrangements for power generation element(s) 126 will depend on a given target application or end-use and will be apparent in light of this disclosure.

In accordance with some embodiments, diverter unit 100 may include instrumentation configured to measure any of a wide range of variables pertaining to the water flowing therethrough, including, for example, temperature, pressure, and flow, among others. To such ends, diverter unit 100 optionally may include one or more appropriately configured sensors. For instance, in accordance with some embodiments, diverter unit 100 optionally may include any one, or combination, of a temperature sensor 128, a pressure sensor 130, and a flow sensor 132 disposed along the flow pathway(s) between inlet pipe 102 and outlet pipes 104, 106. A given sensor 128, 130, 132 may be any suitable standard, custom, or proprietary sensing device, as will be apparent in light of this disclosure. A given temperature sensor 128 may measure the water temperature. A given pressure sensor 130 may measure the water head. A given flow sensor 132 may measure the water flow rate. A given sensor 128, 130, 132 may be configured, in accordance with some embodiments, to be operatively coupled with controller 112 (discussed above). In accordance with some embodiments, diverter unit 100 may include any one, or combination, of a temperature sensor 128, a pressure sensor 130, and a flow sensor 132 disposed within inlet pipe 102, upstream of outlet pipes 104, 106 and diverter valve 108. In accordance with some embodiments, diverter unit 100 may include a flow sensor 132 disposed within second outlet pipe 106, downstream of diverter valve 108.

Diverter unit 100 further may include a housing 134. Housing 134 may be configured, in accordance with some embodiments, to protect the various constituent components of diverter unit 100 by being substantially impermeable to water and debris and, optionally, thermally insulated, in part or in whole. Also, the dimensions, geometry, and material construction of housing 134 may be customized, as desired for a given target application or end-use.

Figure 6:
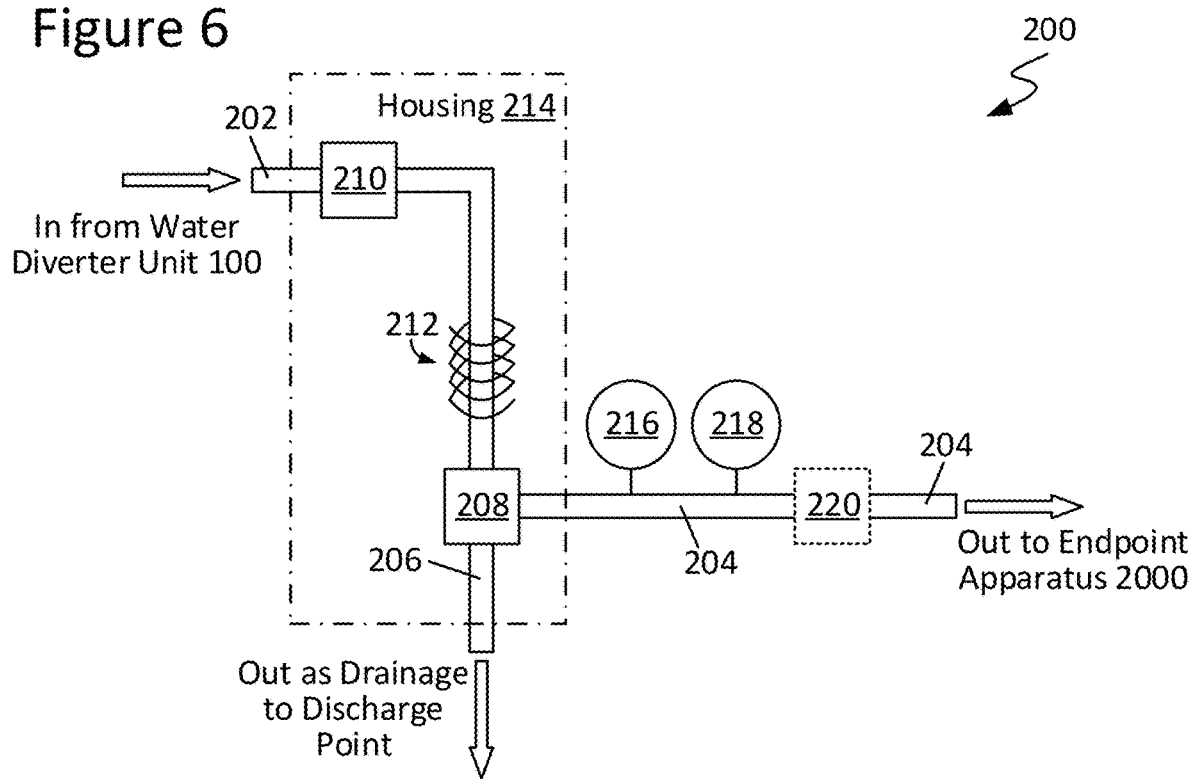
FIG. 6 illustrates a water supply unit configured in accordance with an embodiment of the present disclosure.

FIG. 6 illustrates a water supply unit 200 configured in accordance with an embodiment of the present disclosure. As described herein, supply unit 200 may be configured, in accordance with some embodiments, to receive water from a given upstream diverter unit 100 and to supply a controlled volume of that water to either (or both) a downstream endpoint apparatus 2000 and a downstream discharge point (e.g., as drainage).

As can be seen in FIG. 6, supply unit 200 may include an inlet pipe 202. Inlet pipe 202 may be configured, in accordance with some embodiments, to be operatively coupled, and thus in flow communication, with an upstream diverter unit 100. To that end, in some embodiments, the upstream end of inlet pipe 202 optionally may include an adaptor, flange, or other connector of any suitable configuration for engaging second outlet pipe 106 of diverter unit 100, as will be apparent in light of this disclosure. Inlet pipe 202 also may be configured, in accordance with some embodiments, to be in flow communication with outlet pipes 204, 206 (discussed below).

Supply unit 200 also may include a first outlet pipe 204 and a second outlet pipe 206. First outlet pipe 204 may be configured, in accordance with some embodiments, for flow communication with upstream inlet pipe 202 and an endpoint apparatus 2000, thus providing a first flow pathway through supply unit 200. Second outlet pipe 206 may be configured, in accordance with some embodiments, for flow communication with upstream inlet pipe 202 and a downstream discharge point (e.g., such as a stream), thus providing a second flow pathway through supply unit 200. Second outlet pipe 206 may be configured, in accordance with some embodiments, to permit water to drain out (e.g., by gravity) from supply unit 200 when desired, thereby helping to prevent the water from freezing within supply unit 200 and causing damage thereto. Thus, second outlet pipe 206 may serve, in a general sense, as a drain pipe when there is no downstream demand for water (e.g., when an endpoint apparatus 2000, such as snowmaking equipment, is not in use).

The dimensions (e.g., length; diameter/width), geometry, and material construction of each of inlet pipe 202, first outlet pipe 204, and second outlet pipe 206 of supply unit 200 may be customized, as desired for a given target application or end-use. In some embodiments, any of pipes 202, 204, 206 may be constructed, in part or in whole, from a polyvinylchloride (PVC) material or a stainless-steel material, among other options. Also, in some cases, any of pipes 202, 204, 206 optionally may be thermally insulated, in part or in whole.

Supply unit 200 further may include an adjustable diverter valve 208. Diverter valve 208 may be configured, in accordance with some embodiments, to divert the flow of water through supply unit 200 from inlet pipe 202 through either (or both) outlet pipes 204, 206. To that end, diverter valve 208 may be disposed along the flow pathway from inlet pipe 202 to outlet pipes 204, 206, for instance, at a junction of outlet pipes 204, 206. In some embodiments, diverter valve 208 may be an adjustable flow valve. In some embodiments, diverter valve 208 may be actuated by an associated motor. In some embodiments, diverter valve 208 may be configured to be remotely controlled (e.g., may be radio-controlled via a given RF signal source). To that end, diverter valve 208 may be operatively coupled with an antenna (e.g., similar to antenna 118, discussed above). As will be appreciated in light of this disclosure, providing for remote activation of diverter valve 208 may be beneficial, for instance, in cases where supply unit 200 may not be readily accessible given environmental conditions (e.g., in typical weather conditions prevalent in alpine ski areas).

If diverter valve 208 is adjusted to block off second outlet pipe 206 completely, then the water flowing through inlet pipe 202 may be routed through only first outlet pipe 204.

Thus, diverter valve 208 may be utilized to direct the flow of water to downstream endpoint apparatus 2000 whenever desired (e.g., when snowmaking via a given downstream endpoint apparatus 2000 is desired). If instead diverter valve 208 is adjusted to block off first outlet pipe 204 completely, then the water flowing through inlet pipe 206 may be routed through only second outlet pipe 206. Thus, second outlet pipe 206 may serve, in a general sense, as a bypass or pass-through for water flowing through supply unit 200 from the upstream diverter unit(s) 100 to the downstream discharge point (e.g., stream).

In accordance with some embodiments, when there is a downstream demand for water (e.g., such as during snowmaking operations via endpoint apparatus 2000), diverter valve 208 may be actuated, redirecting the water to first outlet pipe 204 and, in turn, to downstream endpoint apparatus 2000. In accordance with some embodiments, when there is no longer a downstream demand for water, diverter valve 208 may be actuated, redirecting the water to second outlet pipe 206 and, in turn, to the downstream discharge point. In accordance with some embodiments, diverter valve 208 may be designed to fail in the position that seals off first outlet pipe 204, thereby ensuring the normal flow of the water through supply unit 200 will not be negatively impacted by failure of diverter valve 208.

Supply unit 200 may include a regulator valve 210. Regulator valve 210 may be configured, in accordance with some embodiments, to regulate the flow of water through supply unit 200, as received from an upstream diverter unit 100. To that end, regulator valve 210 may be disposed along the flow pathway from inlet pipe 202 to outlet pipes 204, 206, preferably upstream of a junction of outlet pipes 204, 206. In some embodiments, regulator valve 210 may be an adjustable flow valve. In some embodiments, regulator valve 210 may be an intake isolation valve. In some embodiments, regulator valve 210 may be actuated by an associated motor. In some embodiments, regulator valve 210 may be configured to be remotely controlled (e.g., may be radio-controlled via a given RF signal source). To that end, regulator valve 210 may be operatively coupled with an antenna (e.g., similar to antenna 118, discussed above).

Supply unit 200 also may include a cooling element 212 (e.g., a heat exchanger). Cooling element 212 may be configured, in accordance with some embodiments, to cool the water passing through supply unit 200, as received from an upstream diverter unit 100, to a given target temperature. For instance, cooling element 212 may be configured, in accordance with some embodiments, to cool the water to a temperature suitable for snowmaking (e.g., via an endpoint apparatus 2000, such as a snow gun/cannon or other snowmaking equipment). In an example case, cooling element 212 may be configured to reduce the temperature of the water flowing through supply unit 200 to just above freezing (e.g., within 5° F. above the freezing point of water at 32° F.). To such ends, in some embodiments, cooling element 212 may be (or otherwise may include) a series of radiator coils, of copper or other suitable thermally conductive material construction. In accordance with some embodiments, the coils of cooling element 212 may be sized to reduce the water temperature while simultaneously minimizing (or otherwise reducing) pressure loss. In accordance with some embodiments, the coils of cooling element 212 may be arranged in a manner that permits them to drain by gravity (e.g., passively drain) when not in use, thereby preventing (or otherwise reducing the likelihood of) water freezing therein. In some cases, the coils of cooling element 212 may be arranged substantially horizontally (e.g., within ±5° of horizontal).

In accordance with some embodiments, supply unit 200 may include instrumentation configured to measure any of a wide range of variables pertaining to the water flowing therethrough, including, for example, temperature, pressure, and flow, among others. To such ends, supply unit 200 optionally may include one or more appropriately configured sensors, such as any (or all) of the various sensors discussed above, for instance, with respect to diverter unit 100. For instance, in accordance with some embodiments, supply unit 200 optionally may include any one, or combination, of a temperature sensor 128, a pressure sensor 130, and a flow sensor 132 disposed along the flow pathway(s) between inlet pipe 202 and outlet pipes 204, 206.

Supply unit 200 further may include a housing 214. Housing 214 may be configured, in accordance with some embodiments, to protect the various constituent components of supply unit 200 by being substantially impermeable to water and debris. Also, the dimensions, geometry, and material construction of housing 214 may be customized, as desired for a given target application or end-use. In accordance with some embodiments, housing 214 may include one or more ventilation panels (e.g., louvers) thereon that are configured to be opened/closed to adjust the degree of cooling provided to the water flowing through diverter unit 100. In some instances, maximum cooling may be achieved, for instance, when all the ventilation panels are open.

Figure 7:
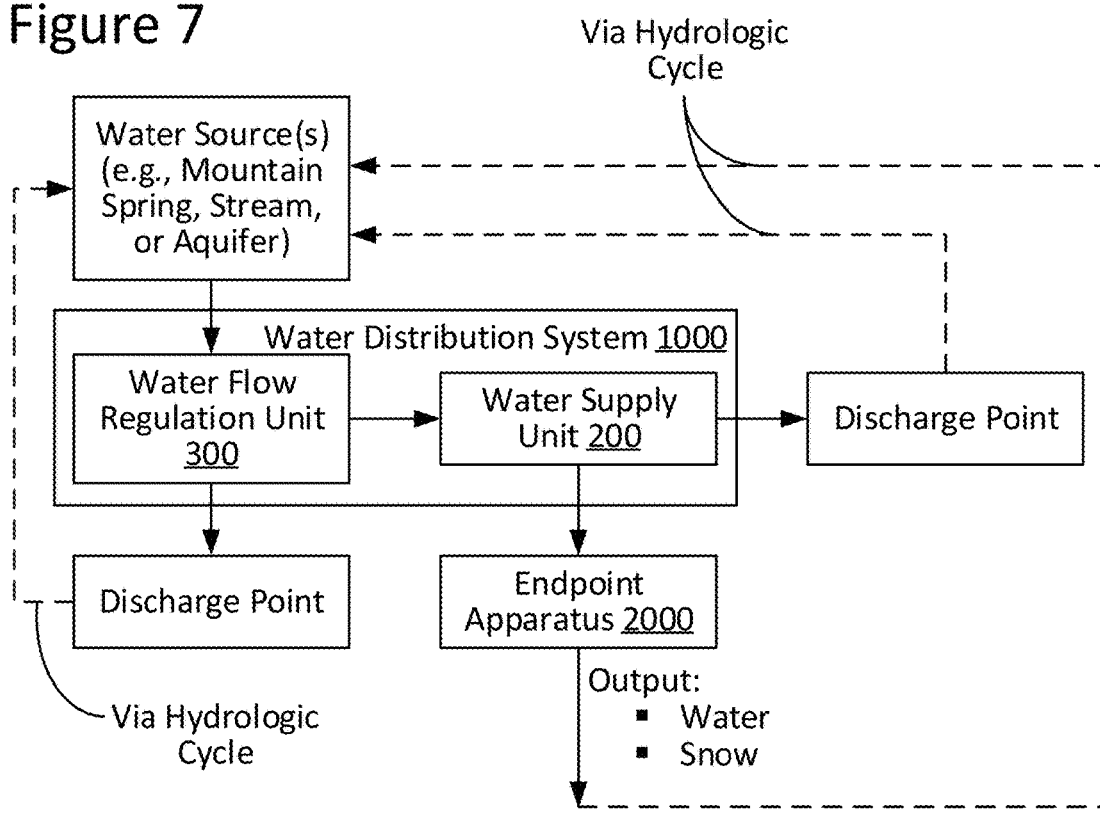
FIG. 7 is a block diagram illustrating an example implementation of a water distribution system configured in accordance with another embodiment of the present disclosure.
Figure 8:
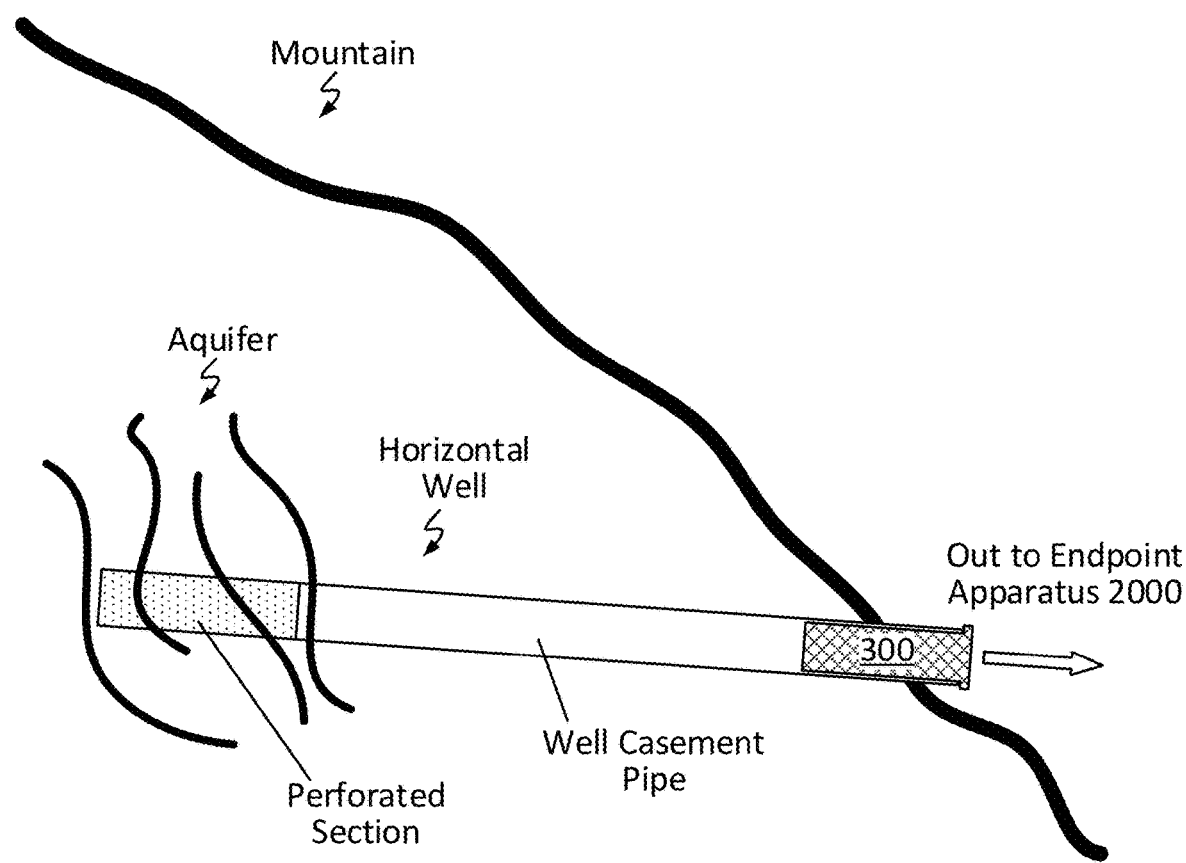
FIG. 8 illustrates an example installation of a flow regulation unit, in accordance with an embodiment of the present disclosure.

Other suitable configurations for diverter unit 100 and supply unit 200, generally, or any of their respective constituent components will depend on a given target application or end-use and will be apparent in light of this disclosure. Also, it should be noted that the present disclosure is not intended to be limited only to a system 1000 including one or more diverter units 100 and one or more supply units 200, as in accordance with some other embodiments, system 1000 may employ additional and/or alternative water distribution means. For instance, consider FIG. 7, which is a block diagram illustrating an example implementation of a water distribution system 1000 configured in accordance with another embodiment of the present disclosure. As can be seen, system 1000 may include a water flow regulation unit 300 (discussed below) and a water supply unit 200. As previously noted, system 1000 may be configured to receive a volume of water from one or more upstream water sources and to distribute that water to one or more downstream destinations. Here, with flow regulation unit 300, system 1000 may be configured to receive water, for example, from a horizontal well tapping an aquifer in a mountain and collecting water via a perforated section of piping. For instance, consider FIG. 8, which illustrates an example installation of a flow regulation unit 300, in accordance with an embodiment of the present disclosure. As will be appreciated in light of this disclosure, the horizontal well may be configured as typically done, including a well casement pipe having a perforated section situated in an aquifer.

Figure 9:
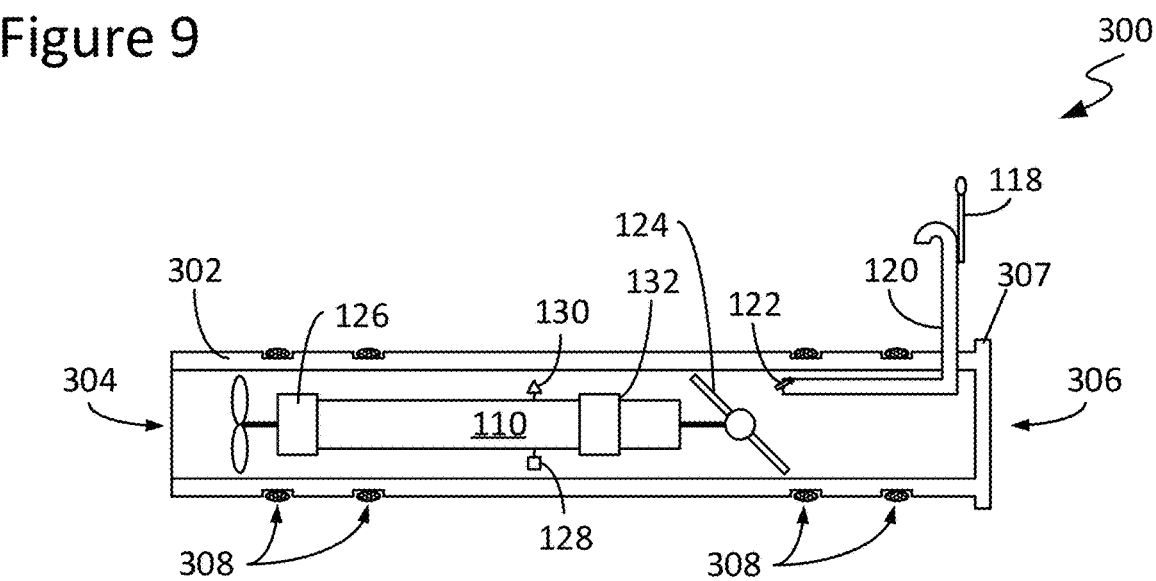
FIG. 9 illustrates a cross-sectional view of a flow regulation unit configured in accordance with an embodiment of the present disclosure.

FIG. 9 illustrates a cross-sectional view of a flow regulation unit 300 configured in accordance with an embodiment of the present disclosure. As can be seen, flow regulation unit 300 includes a main body portion 302. Main body portion 302 may be configured, in accordance with some embodiments, as a pipe sized to be inserted within a well casement pipe of a horizontal well. In accordance with some embodiments, an upstream end 304 of main body portion 302 may be configured for flow communication with the upstream water source (via the horizontal well) and a downstream end 306 of main body portion 302 may be configured for flow communication with a downstream supply unit 200, thus providing a flow pathway through flow regulation unit 300. In some embodiments, downstream end 306 of main body portion 302 optionally may include an adaptor, flange, or other connector 307 of any suitable configuration for engaging inlet pipe 202 of supply unit 200, as will be apparent in light of this disclosure. The dimensions (e.g., length; diameter/width), geometry, and material construction of main body portion 302 of flow regulation unit 300 may be customized, as desired for a given target application or end-use. In some embodiments, main body portion 302 may be constructed, in part or in whole, from a polyvinylchloride (PVC) material or a stainless-steel material, among other options. Also, in some cases, main body portion 302 optionally may be thermally insulated, in part or in whole.

In accordance with some embodiments, the exterior of main body portion 302 may include one or more grooves defined therein and configured to receive and retain corresponding sealing feature(s) 308, such as a polymeric O-ring. Thus, when flow regulation unit 300 is inserted within a well casement pipe, sealing feature(s) 308 may provide a seal between the exterior of main body portion 302 and the interior of the well casement pipe, in accordance with some embodiments.

Figure 10:
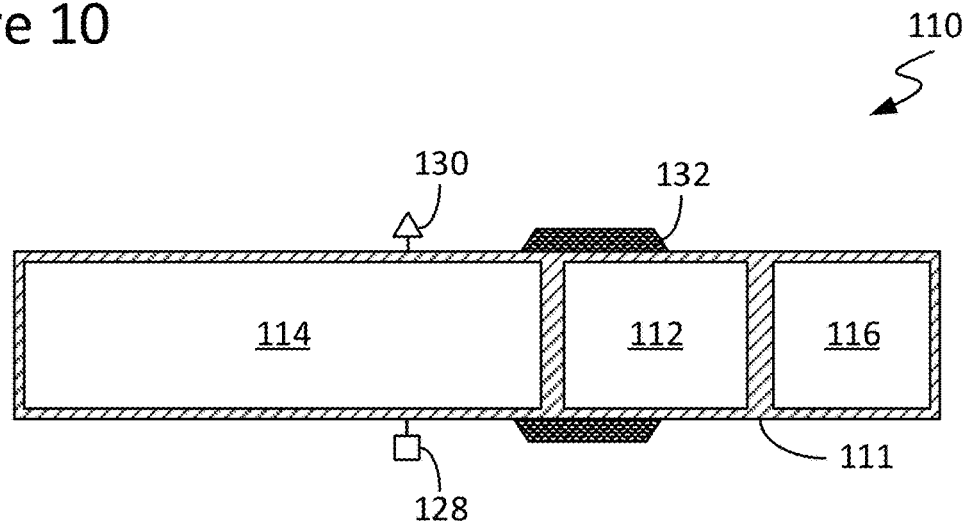
FIG. 10 illustrates a cross-sectional view of an electronics assembly of a flow regulation unit configured in accordance with an embodiment of the present disclosure.

Flow regulation unit 300 also may include an electronics assembly 110 including various electronic elements, such as, for example, a controller 112, a power storage element 114, and a communication module 116, among others. FIG. 10 illustrates a cross-sectional view of an electronics assembly 110 of flow regulation unit 300 configured in accordance with an embodiment of the present disclosure. As can be seen, any (or all) of the constituent electronics of electronics assembly 110 optionally may be housed in a housing 111, which may be configured, in accordance with some embodiments, to protect the housed electronics by being substantially impermeable to water and debris and, optionally, thermally insulated, in part or in whole. Also, the dimensions, geometry, and material construction of housing 111 may be customized, as desired for a given target application or end-use. As will be appreciated in light of this disclosure, the flow of water at a temperature of about 50° F. or greater through flow regulation unit 300 may help to keep the electronic elements within temperature specifications for operation of flow regulation unit 300. As will be further appreciated, the communicative coupling illustrated via FIG. 5 (discussed above) in the context of diverter unit 100 may apply equally, in part or in whole, here in the context of flow regulation unit 300, in accordance with some embodiments.

Controller 112 may be configured to electronically control operation of one or more components of flow regulation unit 300. For instance, controller 112 may be configured, in accordance with some embodiments, to be operatively coupled with any (or all) of shutoff valve 124, power generation element 126, and a given sensor (e.g., such as a temperature sensor 128, a pressure sensor 130, and a flow sensor 132) to effectuate electronic control of the operation thereof. To such ends, controller 112 may host one or more control modules and may be programmed or otherwise configured to output one or more control signals that may be utilized in controlling the operation of a given element of flow regulation unit 300 operatively coupled therewith. In an example embodiment, controller 112 may be a microcontroller, which optionally may be RF networked. As will be appreciated in light of this disclosure, the description provided above, for instance, with respect to programming, encoding, and various modules of controller 112 of diverter unit 100 may apply equally, in part or in whole, here in the context of flow regulation unit 300, in accordance with some embodiments.

Power storage element 114 may be configured to supply a given target amount of electric power to any of the various components of flow regulation unit 300. To that end, power storage element 114 may be any suitable standard, custom, or proprietary power storage device, as will be apparent in light of this disclosure. In some embodiments, power storage element 114 may be a battery, which may be permanent or replaceable. In accordance with some embodiments, power storage element 114 may be configured to be operatively coupled with any (or all) of shutoff valve 124 (e.g., with a motor associated with such valve 124, if optionally present) to provide electric power thereto, for instance, to cause such valve 124 to open or close, as desired. In accordance with some embodiments, power storage element 114 may be configured to be operatively coupled with a power generation element 126 such that electricity generated thereby may be used in charging power storage element 114. In some embodiments, power storage element 114 optionally may include (or otherwise be operatively coupled with) a photovoltaic module (e.g., a solar cell) configured to convert light energy to electrical energy for storage by power storage element 114 or other use by flow regulation unit 300 (or system 1000 more generally). In some embodiments, power storage element 114 optionally may be operatively coupled with a wind turbine configured to convert wind energy to electrical energy for storage by power storage element 114 or other use by flow regulation unit 300 (or system 1000 more generally).

Communication module 116 may be configured as a transmitter, a receiver, or both (i.e., a transceiver). In some cases, communication module 116 may be separate and distinct from controller 112 (e.g., as generally shown in FIG. 5), though in some other cases, communication module 116 may be a component of or otherwise integrated with controller 112. Communication module 116 may be configured, in accordance with some embodiments, for either (or both) wired and wireless communication utilizing any one, or combination, of suitable communication means, such as RF signal, Wi-Fi signal, Bluetooth signal, Universal Serial Bus (USB), Ethernet, or FireWire, among others. In some embodiments, communication module 116 may be (or otherwise include) a wireless router configured to receive and/or transmit RF signals. Communication module 116 may be configured, in accordance with some embodiments, to receive signal(s) from an external source, such as a control device/interface, for example, which may be utilized in remotely operating flow regulation unit 300, in part or in whole. To such ends, communication module 116 may be configured, in accordance with some embodiments, to be operatively coupled with an antenna 118 configured to transmit and/or receive one or more signals.

As noted above, flow regulation unit 300 also may include one or more antennas 118 configured to receive and/or transmit one or more RF signals or other signals. To such ends, a given antenna 118 may be any suitable standard, custom, or proprietary antenna device, as will be apparent in light of this disclosure, and may be directional or omnidirectional, as desired for a given target application or end-use. A given antenna 118 may be configured, in accordance with some embodiments, to be operatively coupled with communication module 116 to communicate with controller 112. In an example embodiment, an antenna 118 may be configured to be attached to or otherwise disposed alongside a vent pipe 120 (discussed below) of flow regulation unit 300.

In accordance with some embodiments, flow regulation unit 300 may include a vent pipe 120. Vent pipe 120 may be configured, in accordance with some embodiments, to vent main body portion 302 to atmosphere, letting air in to displace the water so as to ensure that main body portion 302 drains when desired (e.g., when not in use). In some cases, vent pipe 120 may be configured to provide passive air venting. Vent pipe 120 may be disposed along the flow pathway within flow regulation unit 300, preferably downstream of shutoff valve 124. In accordance with some embodiments, main body portion 302 may be vented via vent pipe 120 to allow any water therein to drain out (e.g., by gravity), helping to prevent the water from freezing therein and causing damage to main body portion 302, electronics assembly 110, power generation element 126, and any sensors 128, 130, 132. The dimensions (e.g., length; diameter/width), geometry, and material construction of vent pipe 120 may be customized, as desired for a given target application or end-use. In some embodiments, vent pipe 120 may be constructed, in part or in whole, from a polyvinylchloride (PVC) material or a stainless-steel material, among other options. Also, as will be appreciated in light of this disclosure, in at least some cases, it may be desirable to ensure that vent pipe 120 is of sufficient length to prevent (or otherwise reduce the likelihood) of its being completely covered and blocked, for instance, by snow and ice.

In accordance with some embodiments, flow regulation unit 300 includes an adjustable shutoff valve 124. Shutoff valve 124 may be configured, in accordance with some embodiments, to stop or otherwise regulate the flow of water through flow regulation unit 300. To that end, shutoff valve 124 may be disposed along the flow pathway within main body portion 302. In some embodiments, shutoff valve 124 may be actuated by an associated motor. In some embodiments, shutoff valve 124 may be configured to be remotely controlled (e.g., may be radio-controlled via a given RF signal source). To that end, shutoff valve 124 may be operatively coupled with an antenna 118 and controller 112.

In accordance with some embodiments, flow regulation unit 300 may include a power generation element 126 disposed along its flow path. Power generation element 126 may be configured, in accordance with some embodiments, to generate electricity from the flow of water therethrough. To that end, power generation element 126 may be any suitable standard, custom, or proprietary turbine-based electricity generator, as will be apparent in light of this disclosure. In some cases, power generation element 126 may be, for instance, a DC microturbine generator configured to generate DC power. The electricity produced by power generation element 126 may be used to charge power storage element 114 and/or to power one or more components of flow regulation unit 300, in accordance with some embodiments. In accordance with some embodiments, a given power generation element 126 may be configured to provide enough power to recharge power storage element 114 and, therefore, allow flow regulation unit 300 to operate remotely for an extended period (e.g., for an entire season ski season or longer).

In accordance with some embodiments, flow regulation unit 300 may include instrumentation configured to measure any of a wide range of variables pertaining to the water flowing therethrough, including, for example, temperature, pressure, and flow, among others. To such ends, flow regulation unit 300 optionally may include one or more appropriately configured sensors. For instance, in accordance with some embodiments, diverter unit 100 optionally may include any one, or combination, of a temperature sensor 128, a pressure sensor 130, and a flow sensor 132 disposed along the flow pathway within main body portion 302. As will be appreciated in light of this disclosure, the description provided above, for instance, with respect to the various sensors 128, 130, 132 of diverter unit 100 may apply equally, in part or in whole, here in the context of flow regulation unit 300, in accordance with some embodiments. A given sensor 128, 130, 132 may be configured, in accordance with some embodiments, to be operatively coupled with controller 112 (discussed above).

As variously described herein, one or more endpoint apparatuses 2000 may be configured to receive water provided from an upstream system 1000, in accordance with some embodiments. As will be appreciated in light of this disclosure, any of a wide range of water-utilizing endpoint apparatuses can be envisioned for use with system 1000. For instance, in accordance with some embodiments, a given endpoint apparatus 2000 may be a piece of snowmaking equipment, such as a snow gun/cannon, and system 1000 may be configured to distribute water thereto for snowmaking. In such cases, snow may be made by forcing water, as supplied by system 1000, and (optionally) pressurized air through the snow gun/cannon.

In accordance with some embodiments, it may be desirable to include instrumentation configured to measure any of a wide range of variables pertaining to the water flowing out of supply unit 200, including, for example, temperature and pressure, among others. To such ends, one or more appropriately configured gauges may be disposed along the flow path between supply unit 200 and endpoint apparatus 2000. For instance, in accordance with some embodiments, either (or both) a temperature gauge 216 and a pressure gauge 218 may be disposed along the flow path between supply unit 200 and endpoint apparatus 2000. A given gauge 216, 218 may be any suitable standard, custom, or proprietary sensing/readout device, as will be apparent in light of this disclosure. A given gauge 216, 218 may allow an operator to monitor the water being supplied to endpoint apparatus 2000.

As will be appreciated in light of this disclosure, the pressure of the water exiting supply unit 200 and being delivered to endpoint apparatus 2000 will depend, at least in part, on the difference in elevation between diverter unit 100 and supply unit 200. If the water pressure is insufficient for a given target application or end-use, then it may be desirable to provide means for increasing the water pressure by a given desired amount. To that end, a pump 220 (e.g., a booster pump) optionally may be disposed along the flow path between supply unit 200 and endpoint apparatus 2000, in accordance with some embodiments. Pump 220 may be any suitable standard, custom, or proprietary water pumping device, as will be apparent in light of this disclosure. In some instances, pump 220 may be AC-powered.

In accordance with some embodiments, pump 220 additionally or alternatively may be configured as a computer-controlled variable pressure and flow pump. In at least some such cases, pump 220 may be configured, in accordance with some embodiments, to automatically regulate the pressure and/or flow of water according to one or more schemes, which may be predetermined, user-designated, and/or customized, for example, based on one or more environmental factors. In some embodiments, pump 220 may be configured to automate pressure and/or flow, for instance, for optimal (e.g., best possible) snow production based on prevailing weather conditions. Other suitable water pressure and/or flow schemes may be employed with pump 220, as desired for a given target application or end-use.

Installation and Networking

In accordance with some embodiments, system 1000 may be installed such that its water diverter unit 100 or flow regulation unit 300, as the case may be, is situated at an elevation (with respect to its water supply unit 200) that helps to ensure the water pressure at the inlet of power generation element 126 (e.g., in the case of a turbine generator) is within manufacturer specifications. If the pressure of the water leaving the upstream water collection system at the water source(s) is sufficiently high, then diverter unit 100 (or flow regulation unit 300) may be installed at substantially the same elevation as the upstream collection system. If the water pressure is too low, however, then the target pressure may be achieved, for instance, by increasing the vertical drop between the collection system and diverter unit 100 (or flow regulation unit 300). If locating diverter unit 100, for example, in this manner is not practical, then power generation element 126 optionally may be installed in piping at a downstream location, rather than within diverter unit 100 itself.

In accordance with some embodiments, diverter unit 100 (or flow regulation unit 300) and supply unit 200 may be operatively coupled to provide flow communication therebetween using any suitable piping means, as will be apparent in light of this disclosure. In some instances, supply unit 200 may be disposed several hundred feet away from an upstream diverter unit 100 (or an upstream flow regulation unit 300, as the case may be) and operatively coupled therewith via intervening piping means.

Figure 11:
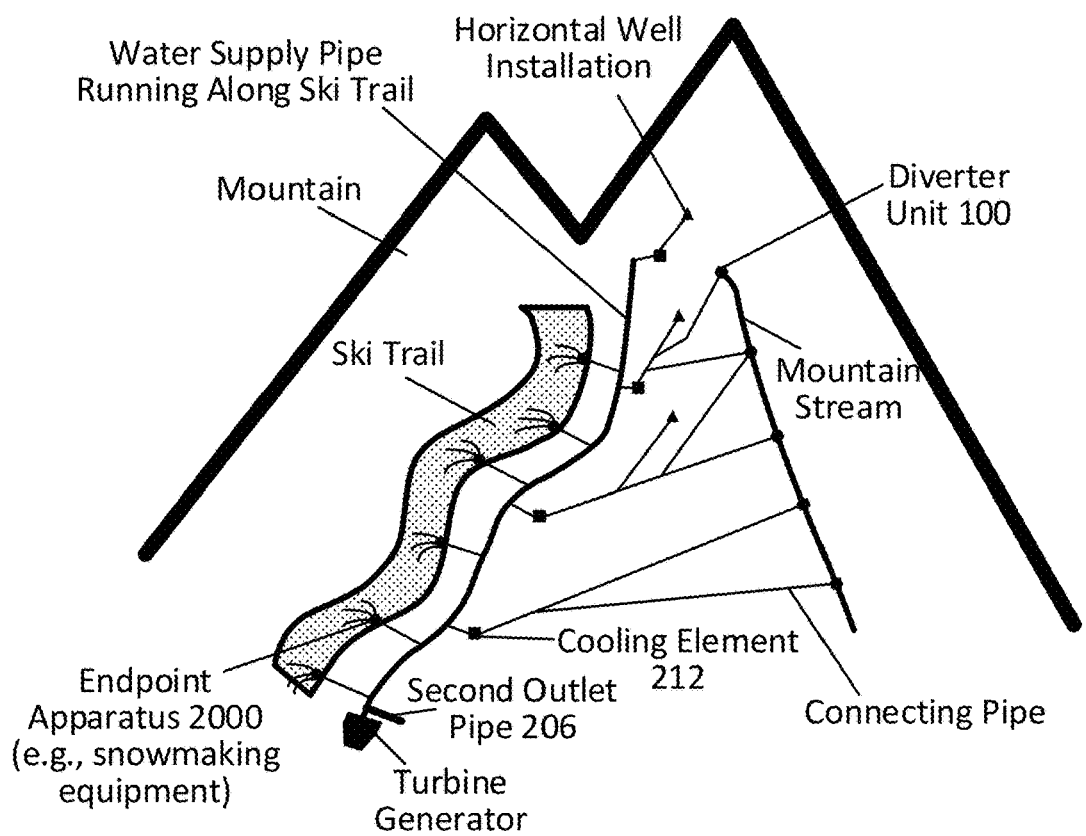
FIG. 11 illustrates an example implementation of a distributed water-gathering network including a plurality of water distribution systems installed at a mountain, in accordance with an embodiment of the present disclosure.

In accordance with some embodiments, multiple water distribution systems 1000, as variously described herein, may be installed at a given site and provided with a given degree of network-like flow communication. For instance, consider FIG. 11, which illustrates an example implementation of a distributed water-gathering network including a plurality of systems 1000 installed at a mountain, in accordance with an embodiment of the present disclosure. As can be seen here, a plurality of system 1000 installations may be networked together such that water collected from various water sources (e.g., springs, streams, aquifers, and/or horizontal wells) is aggregated for downstream use. The various constituent systems 1000 of the network may be arranged in parallel or series (or both) flow communication with one another, as desired.

In accordance with some embodiments, the amount of water diverted from each system 1000 installation may be controlled remotely via an RF network, as described herein. Moreover, in accordance with some embodiments, the various controllers and sensors of networked systems 1000 may be networked. Furthermore, in accordance with some embodiments, it may be possible to remotely monitor the operational status of the networked systems 1000, in part or in whole. In this manner, each individual system 1000 installation may be operated within regulatory constraints.

In accordance with some embodiments, a network of systems 1000, in the aggregate, may be configured to operate in a manner sufficient to provide water for snowmaking over an entire host mountain. During the snowmaking season, the gathered water may be aggregated and channeled to an array of downstream endpoint apparatuses 2000 (e.g., snowmaking equipment, such as snow guns/cannons).

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description. Future-filed applications claiming priority to this application may claim the disclosed subject matter in a different manner and generally may include any set of one or more limitations as variously disclosed or otherwise demonstrated herein.

What is claimed is:

1. A water distribution system comprising:
    a water diverter unit comprising:
        a first inlet pipe configured to be in flow communication with a water source to receive water therefrom;
        a first outlet pipe configured to be in flow communication with the first inlet pipe and a first downstream discharge point;
        a second outlet pipe configured to be in flow communication with the first inlet pipe and a downstream endpoint apparatus configured to utilize the water;
        a first diverter valve configured to direct the water between the first outlet pipe and the second outlet pipe, wherein the first diverter valve is motor-actuated and wirelessly controlled; and
        an electronics assembly sealed within a first insulated housing disposed within the water diverter unit, the electronics assembly comprising:
            a controller configured to control the first diverter valve in directing the water between the first outlet pipe and the second outlet pipe;
            a power storage element configured to provide electric power to actuate the first diverter valve in directing the water between the first outlet pipe and the second outlet pipe; and
            a communication module configured to receive a wireless signal and communicate with the controller in controlling the first diverter valve in directing the water between the first outlet pipe and the second outlet pipe; and
        a local power generation element operatively coupled with the power storage element and configured to generate electricity to be stored by the power storage element; and
    a water supply unit comprising:
        a second inlet pipe configured to be in flow communication with the second outlet pipe of the water diverter unit to receive water therefrom;
        a third outlet pipe configured to be in flow communication with the second inlet pipe and the downstream endpoint apparatus;
        a fourth outlet pipe configured to be in flow communication with the second inlet pipe and either the first downstream discharge point or a second downstream discharge point;
        a second diverter valve configured to direct the water between the third outlet pipe and the fourth outlet pipe; and
        a computer-controlled variable pressure and flow pump configured to automatically regulate at least one of a pressure and a flow of the water through the third outlet pipe according to a scheme based on prevailing weather conditions.

2. The water distribution system of claim 1, wherein the water diverter unit further comprises at least one of:
    a temperature sensor disposed within a flow pathway of the first inlet pipe;

a pressure sensor disposed within a flow pathway of the first inlet pipe; and at least one flow sensor disposed within at least one of:
a flow pathway of the first inlet pipe; and
a flow pathway of the second outlet pipe.

3. The water distribution system of claim 1, wherein:
the power storage element is a battery; and
the local power generation element comprises a turbine generator disposed within a flow pathway of one of the first inlet pipe or the first outlet pipe and configured to generate electricity.

4. The water distribution system of claim 1, wherein the water diverter unit further comprises an adjustable shutoff valve disposed within a flow pathway of the first inlet pipe.

5. The water distribution system of claim 1, wherein the water diverter unit further comprises a vent pipe configured to vent at least one of the first outlet pipe and the second outlet pipe to atmosphere.

6. The water distribution system of claim 5, wherein the water diverter unit further comprises an adjustable shutoff valve disposed within a flow pathway of the vent pipe.

7. The water distribution system of claim 1, wherein the water diverter unit further comprises a second insulated housing configured to house:
at least a portion of each of the first inlet pipe, the first outlet pipe, and the second outlet pipe;
the first diverter valve; and
the electronics assembly.

8. The water distribution system of claim 1, wherein the water source is situated at a mountain and comprises at least one of a spring, a stream, an aquifer, and a horizontal well.

9. The water distribution system of claim 1, wherein the water source is at a location that experiences freezing environmental conditions.

10. The water distribution system of claim 1, wherein the downstream endpoint apparatus comprises a piece of snow-making equipment.

11. The water distribution system of claim 1, wherein the water supply unit further comprises a cooling element configured to reduce a temperature of the water upstream of the downstream endpoint apparatus.

12. The water distribution system of claim 11, wherein the cooling element comprises a series of radiator coils.

13. The water distribution system of claim 1, wherein the water supply unit further comprises a third housing configured to house:
at least a portion of each of the second inlet pipe, the third outlet pipe, and the fourth outlet pipe;
the second diverter valve; and
the cooling element.

14. The water distribution system of claim 13, wherein the third housing includes at least one ventilation panel configured to be opened and closed to adjust a degree of cooling provided to the water within the water supply unit.

* * * * *